Oct. 20, 1953
P. WARREN
2,655,758
TROTLINE OR THE LIKE
Filed Jan. 7, 1949
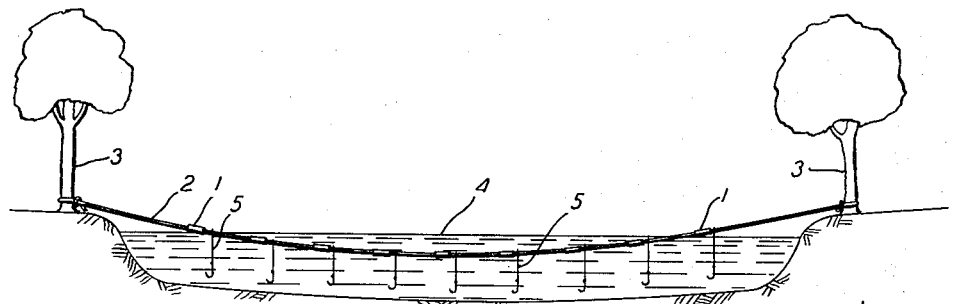
Fig. 1.
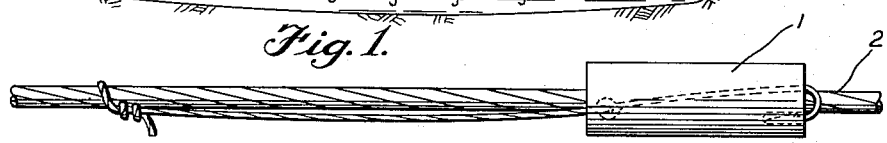
Fig. 2.
Fig. 3.
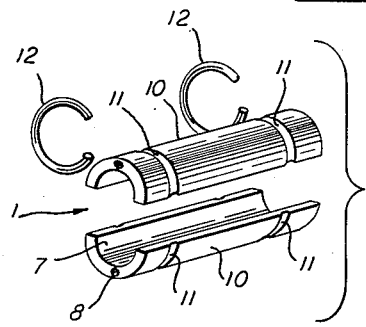
Fig. 5.
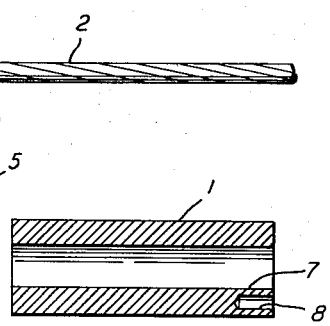
Fig. 4.
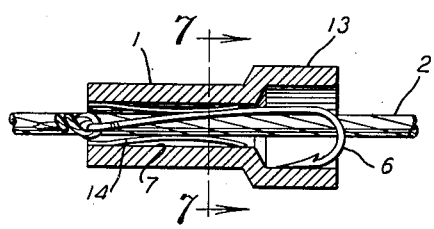
Fig. 6.
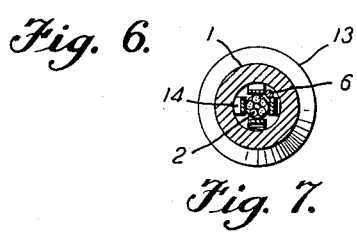
Fig. 7.
Fig. 8.
PAT WARREN
INVENTOR
BY *Herbert J. Brown*
ATTORNEY Patented Oct. 20, 1953

2,655,758

UNITED STATES PATENT OFFICE 2,655,758

TROTLINE OR THE LIKE

Pat Warren, Fort Worth, Tex.

Application January 7, 1949, Serial No. 69,695

2 Claims. (Cl. 43—27.4)

This invention relates to trotlines, trawl lines, throw lines, and other fishing lines having short lines with hooks thereon and attached to a primary line.

An object of the invention is to provide safety means whereby a primary line having short lines and hooks attached thereto may be handled without hooking the user.

Another object of the invention is to provide means whereby the primary line may be rolled or coiled, as on a reel, without the short lines becoming tangled with each other or with objects they may come in contact with.

A further object of the invention is to provide safety means and an arrangement of parts for trotlines and the like whereby the individual hooks may be conveniently covered or uncovered when setting out, baiting, retrieving fish, or reeling in such lines.

A further object of the invention is to provide a construction and arrangement whereby the short lines of a trotline or the like may be readily positioned substantially parallel with the primary line for conveniently handling the latter.

These and other objects of the invention will become apparent from the following detailed description of exemplary forms of the invention, taken in connection with the accompanying drawings, wherein:

Figure 1 is a transverse view of a river bed and showing a trotline embodying the features of the present invention positioned thereacross.

Figure 2 is a side elevational view of a broken length of primary line with a short line and hook attached thereto, together with a slide positioned thereon and arranged for covering the barb of the hook and for holding the short line substantially parallel with the primary line.

Figure 3 is a view similar to Figure 2, but showing the slide positioned for allowing the short line and hook to hang from the primary line.

Figure 4 is a longitudinal central sectional view of the slide shown in Figures 1, 2, and 3.

Figure 5 is an exploded perspective view of a modified form of slide capable of attachment to the primary line without threading the latter through the former.

Figure 6 is a longitudinal central sectional view of a further modified form of a slide in accordance with the invention, and showing the same slidably disposed on a length of primary line and enclosing a hook attached to a short line.

Figure 7 is a lateral sectional view taken on lines 7—7 of Figure 6, and

Figure 8 is a perspective view of a reel, and showing a fishing line in accordance with the present invention, wound thereon.

The form of the invention shown in Figures 1 through 4 employs tubular slides 1 mounted on the primary fishing line 2. As shown in Figure 1, the ends of the primary line 2 may be tied to trees 3 on opposite banks of a river 4 and having central portion or length of said line submerged below the surface of the water. Short lines 5 are tied at intervals or stages along the length of the primary line 2, and each short line has a fish hook 6 tied to its outer end. There is a tubular slide 1 for coaction with each short line 5, and the central opening 7 through each said slide is large enough to accommodate and frictionally engage the primary line 2 and the related short line 5. By moving slides 1 along the primary line 2 and over the adjacent short lines 5, and substantially over the length of the respective attached hooks 6, the short lines 5 may be caused to assume positions substantially parallel with the length of the primary line. The described arrangement and operation provides for conveniently handling the primary line when setting out or taking in the same since the short lines are prevented from dangling or becoming tangled with each other. The barbs of the hooks 6 are confined by the slides 1 and thereby protect the user's hands, and also prevent the hooks from becoming caught on obstructions they come in contact with. Recesses 8 may be formed in the ends of the slides 1 to receive and enclose the barbs of the hooks 6. By moving each slide 1 along the length of the short line 5, away from its attached hook 6, each short line may be caused to swing freely for baiting. When reeling in the primary line 2, as on a reel 9, as shown in Figure 7, the slides 1 are consecutively positioned over the short lines 5 to substantially enclose each hook 6.

The form of the invention shown in Figure 5 is substantially the same as shown in Figures 1 through 4, and differs therefrom in that the slide 1 is comprised of longitudinally and centrally divided members 10 which have corresponding semi-annular grooves 11 in their surfaces near each end thereof, and which grooves are adapted to receive arcuate spring clips 12 for holding each member 10 to form the assembled tubular slide 1. Preferably, a hook receiving recess 8 is formed in each end of each half member 10 in both ends thereof, and the semi-annular grooves 11 are each equidistant from its adjacent end, and whereby the half members 10 may be assembled without considering one end from the other. When assembled, the form of the invention illustrated in Figure 5 includes the longitudinal opening 7 therethrough. By reason of the described construction, the divided members 10 may be applied to the primary line 2 at points along the length thereof by means of the spring clips 12. The last described form of the invention otherwise operates in the same manner as the form of the invention illustrated in Figures 1 through 4.

The form of the invention illustrated in Figure 6 includes the described tubular body 1 and central opening 7 therethrough, and also includes an enlarged and bell-shaped end 13 for enclosing the barbed end of the hook 6. Inwardly directed bowed springs 14 are provided within the central opening 7 for frictionally engaging the primary line 2. The springs 14 may be secured in place by any suitable means, such as cementing, or by making the same integral with the tubular body 1. The operation of the last described form is the same as the previously described forms, but differs in that the bell of the hook 6 is received within the bell portion 13.

The invention is not restricted to the constructions illustrated and described, but may be made in many ways within the scope of the appended claims.

What is claimed is:

1. A trot line or the like comprising a primary line and at least one short line attached thereto and intermediate the ends thereof, a fish hook attached to the free end of said short line, and a slide having an opening therethrough slidably mounted on and receiving said primary line and said short line.

2. A trot line or the like as defined in claim 1 and wherein a recess is provided in the end of said slide adjacent said hook when the shank of the latter is received within said slide, said recess being arranged to receive the barb of said hook therein.

PAT WARREN.

References Cited in the file of this patent

UNITED STATES PATENTS

| Number | Name | Date |
|---|---|---|
| 118,772 | Camp | Sept. 5, 1871 |
| 1,163,193 | Althoff | Dec. 7, 1915 |
| 1,907,629 | Walty | May 9, 1933 |
| 2,014,517 | Beregow | Sept. 17, 1935 |
| 2,037,232 | Hendricks | Apr. 14, 1936 |
| 2,095,048 | Aikins | Oct. 5, 1937 |
| 2,140,724 | Stefan | Dec. 20, 1938 |
| 2,151,609 | Menderman | Mar. 21, 1939 |
| 2,204,185 | Lougheed | June 11, 1940 |
| 2,241,320 | Sarff | May 6, 1941 |
| 2,346,412 | Bratz | Apr. 11, 1944 |
| 2,498,815 | McVay | Feb. 28, 1950 |
| 2,514,110 | Warren | July 4, 1950 |

FOREIGN PATENTS

| Number | Country | Date |
|---|---|---|
| 68,232 | Norway | May 27, 1946 |